United States Patent
Hadavand et al.

(10) Patent No.: US 11,062,330 B2
(45) Date of Patent: Jul. 13, 2021

(54) COGNITIVELY IDENTIFYING A PROPENSITY FOR OBTAINING PROSPECTIVE ENTITIES

(71) Applicant: INTERNATIONAL BUSINESS MACHINES CORPORATION, Armonk, NY (US)

(72) Inventors: Aboozar Hadavand, Baltimore, MD (US); Daksh Sikri, Toronto (CA); Imren Johar, Clifton, VA (US); Leo Kluger, Spring Valley, NY (US); Nikolay Kadochnikov, Batavia, IL (US); Sampoorna Dasgupta, New York, NY (US); Thevuthasan Senthuran, White Plains, NY (US); Tomomi Yoshioka, Hoboken, NJ (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 138 days.

(21) Appl. No.: 16/056,258

(22) Filed: Aug. 6, 2018

(65) Prior Publication Data

US 2020/0043019 A1    Feb. 6, 2020

(51) Int. Cl.
  *G06Q 30/02*    (2012.01)
  *G06N 20/00*    (2019.01)
  (Continued)

(52) U.S. Cl.
  CPC ....... *G06Q 30/0201* (2013.01); *G06F 16/288* (2019.01); *G06F 16/904* (2019.01);
  (Continued)

(58) Field of Classification Search
  None
  See application file for complete search history.

(56) References Cited

U.S. PATENT DOCUMENTS 8,117,199 B2 * 2/2012 Ghani ............... G06Q 30/0204
                                                       707/734
8,423,425 B2 * 4/2013 Psota ................ G06Q 30/0609
                                                       705/26.35

(Continued)

FOREIGN PATENT DOCUMENTS

WO   WO-2009065029 A1 *  5/2009  ............ G06Q 30/06
WO   WO-2011017613 A2 *  2/2011  ........... G06Q 20/384
WO   WO-2017136687 A1 *  8/2017  ......... G06F 16/3344

OTHER PUBLICATIONS

Al-Thuhli, Amjed, and Mohammed Al-Badawi. "A Framework to Analyze Social Tagging and Unstructured Data." 2020 3rd International Conference on Information and Computer Technologies (ICICT). IEEE, 2020. (Year: 2020).*

(Continued)

*Primary Examiner* — Matthew S Gart
*Assistant Examiner* — Derick J Holzmacher
(74) *Attorney, Agent, or Firm* — Griffiths & Seaton PLLC

(57) ABSTRACT

Embodiments for cognitively identifying a propensity for obtaining white space target entities by a processor. Similarities between one or more potential target entities and current entities may be compared according to structured data and unstructured data. A propensity to engage in a transaction agreement may be determined for the one or more potential target entities according to the similarities and historical transaction agreements.

17 Claims, 10 Drawing Sheets

(51) Int. Cl.
  *G06F 16/28* (2019.01)
  *G06F 16/904* (2019.01)
  *G06F 40/30* (2020.01)
  *G06F 40/205* (2020.01)
  *G06F 40/284* (2020.01)

(52) U.S. Cl.
  CPC .......... *G06F 40/205* (2020.01); *G06F 40/284* (2020.01); *G06F 40/30* (2020.01); *G06N 20/00* (2019.01); *G06Q 30/0251* (2013.01)

(56) References Cited

U.S. PATENT DOCUMENTS

| | | | | |
|---|---|---|---|---|
| 8,626,618 | B2* | 1/2014 | Psota | G06Q 30/06 705/30 |
| 10,410,224 | B1* | 9/2019 | Levanon | G06Q 30/02 |
| 2007/0067297 | A1* | 3/2007 | Kublickis | G06Q 20/29 |
| 2007/0094066 | A1* | 4/2007 | Kumar | G06Q 30/06 706/61 |
| 2008/0154704 | A1* | 6/2008 | Flake | G06Q 20/209 705/14.41 |
| 2008/0294621 | A1* | 11/2008 | Kanigsberg | G06Q 30/0625 |
| 2010/0049538 | A1* | 2/2010 | Frazer | G06Q 30/02 705/14.4 |
| 2011/0035288 | A1* | 2/2011 | Clyne | G06Q 30/0275 705/14.71 |
| 2011/0047072 | A1* | 2/2011 | Ciurea | G06Q 30/02 705/39 |
| 2011/0087531 | A1* | 4/2011 | Winters | G06Q 30/0207 705/14.17 |
| 2011/0093453 | A1 | 4/2011 | Frayman et al. | |
| 2011/0106807 | A1* | 5/2011 | Srihari | G06F 16/288 707/739 |
| 2011/0173093 | A1* | 7/2011 | Psota | G06Q 30/06 705/26.35 |
| 2011/0295722 | A1* | 12/2011 | Reisman | G06Q 30/0641 705/27.1 |
| 2012/0203584 | A1 | 8/2012 | Mishor et al. | |
| 2012/0203708 | A1* | 8/2012 | Psota | G06Q 30/06 705/347 |
| 2013/0173427 | A1* | 7/2013 | Swindells | G06Q 30/0201 705/26.61 |
| 2013/0317954 | A1* | 11/2013 | Psota | G06Q 40/02 705/30 |
| 2014/0258032 | A1* | 9/2014 | Psota | G06Q 30/0609 705/26.35 |
| 2015/0073929 | A1* | 3/2015 | Psota | G06Q 30/0605 705/26.2 |
| 2015/0112755 | A1 | 4/2015 | Potdar et al. | |
| 2015/0127419 | A1* | 5/2015 | Tiwari | G06F 16/24578 705/7.29 |
| 2016/0092557 | A1* | 3/2016 | Stojanovic | G06F 16/254 707/723 |
| 2016/0092781 | A1* | 3/2016 | Byrnes | G06Q 30/0631 706/52 |
| 2016/0132908 | A1* | 5/2016 | von Walstrom | G06Q 30/0255 705/7.25 |
| 2016/0148222 | A1* | 5/2016 | Davar | G06Q 30/0201 705/7.32 |
| 2017/0046627 | A1* | 2/2017 | Flood | G06Q 30/0269 |
| 2017/0053336 | A1* | 2/2017 | Barbour | G06F 16/9535 |
| 2017/0091320 | A1* | 3/2017 | Psota | G06F 16/334 |
| 2017/0103439 | A1* | 4/2017 | Kolb | G06F 16/93 |
| 2017/0103441 | A1* | 4/2017 | Kolb | G06F 16/93 |
| 2017/0262868 | A1* | 9/2017 | Manjunath | G06F 16/907 |
| 2018/0129971 | A1* | 5/2018 | Vlassis | G06Q 30/0255 |
| 2018/0330270 | A1* | 11/2018 | Domer | G06Q 10/10 |

OTHER PUBLICATIONS

Brunner, Ursin, and Kurt Stockinger. "Entity matching on unstructured data: an active learning approach." 2019 6th Swiss Conference on Data Science (SDS). IEEE, 2019. (Year: 2019).*

Jabri, Siham, et al. "Ranking of text documents using TF-IDF weighting and association rules mining." 2018 4th International Conference on Optimization and Applications (ICOA). IEEE, 2018. (Year: 2018).*

Dunn & Bradstreet, "Customer Profiling: Using Your Customer Data to Improve Your Marketing ROI," White Paper, 2013 (6 pages).

Experian, "The art of customer profiling," White Paper, 2013 (18 pages).

Anonymous, "PMO Cognitive System for resource candidates selection," An IP.com Prior Art Database Technical Disclosure, IP.com No. IPCOM000252782D, Feb. 8, 2018 (8 pages).

Anonymous, "Method of intelligent selection against service types based on mass voice data analysis," An IP.com Prior Art Database Technical Disclosure, IP.com No. IPCOM000249266D, Feb. 15, 2017 (5 pages).

Anonymous, "Cognitive Method and System to Identify which SaaS Services Should be Proposed to a Customer Based on a Cognitive Analysis of Customers' Needs," An IP.com Prior Art Database Technical Disclosure, IP.com No. IPCOM000248511D, Dec. 12, 2016 (4 pages).

* cited by examiner

COGNITIVELY IDENTIFYING A PROPENSITY FOR OBTAINING PROSPECTIVE ENTITIES

BACKGROUND OF THE INVENTION

Field of the Invention

The present invention relates in general to computing systems, and more particularly to, various embodiments for cognitively identifying a propensity for obtaining white space target entities by a processor.

Description of the Related Art

In today's interconnected and complex society, computers and computer-driven equipment are more commonplace. Processing devices, with the advent and further miniaturization of integrated circuits, have made it possible to be integrated into a wide variety of devices. Due to the recent advancement of information technology and the growing popularity of the Internet, a vast amount of information is now available in digital form. Such availability of information or data has provided many opportunities. As the technology field grows exponentially each year and ever-growing amounts of data are stored, retrieved, and accessed on computing systems, the need to deliver accurate and applicable data becomes increasingly paramount. Consequently, the need for advancement in a computing system capable of recommending relevant and accurate information is of great precedence.

SUMMARY OF THE INVENTION

Various embodiments for cognitively identifying white space target entities by a processor, are provided. In one embodiment, by way of example only, a method for cognitively identifying a substantial likelihood/propensity for obtaining new white space target clients (e.g., prospective entities/clients having no transactional history), by a processor, is provided. Similarities between one or more potential target entities and current entities may be compared according to structured data and/or unstructured data. A propensity to engage in a transaction agreement may be determined for the one or more potential target entities according to the similarities and a historical transaction agreements.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
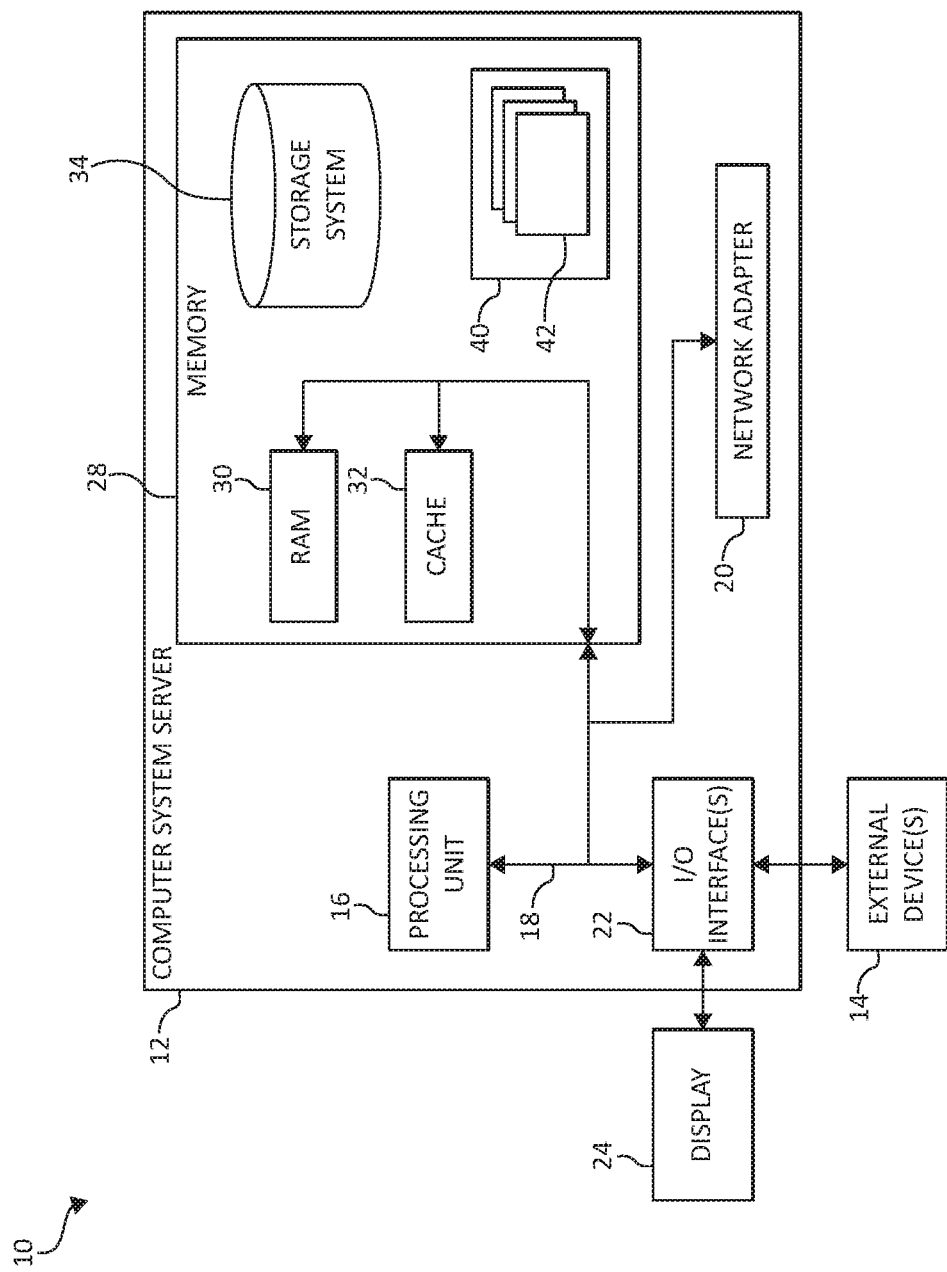
FIG. 1 is a block diagram depicting an exemplary computing node according to an embodiment of the present invention.

The advancement of computing storage and computational power provide the ability to collect large amounts of data, particularly for various types of data relating to businesses, organizations, or governments. Moreover, as the amount of electronic information continues to increase, the demand for sophisticated information access systems also grows. Digital or "online" data has become increasingly accessible through real-time, global computer networks. Many data-intensive applications require the extraction of information from data sources, such as, for example, within a business environment.

More specifically, improving productivity, effectiveness, and opportunities of a business, organization, or government entity can be an effective operational strategy to drive revenue growth and manage bottom-line expenses. In one aspect, an entity or "enterprise entity" includes, but is not limited to: a private organization (e.g., bank, private company, etc.), a public organization (e.g., public school, government, police/fire department, post office, etc.), non-profit organization, a person, a product, etc. In an additional aspect, and entity may be a client of another entity (e.g., a person is a client of a business or a certain business is a client of another type of business, etc.). Sales productivity, effectiveness, and opportunity are among critical issues for most companies, especially those with a sales force and client-oriented organizations (e.g., consulting companies, insurance companies, software and hardware manufacturers, etc.).

Entities generally find it difficult to easily discover and acquire new clients. In one aspect, entities may identify most profitable and desirable current clients, then search for look-a-like clients in the prospective space. However, entities must absorb high costs (e.g., financial costs, resource costs, time costs, etc.) when acquiring and winning new clients, since only certain classes of information have been available to profile prospects and search for the most similar clients. While more information may sometimes be available, such information may be expensive to access since information providers may require a high price for the data.

When external profiling information is unavailable, costs also increase, since companies usually end up using a shotgun approach (e.g., indiscriminate, haphazard, or extremely broad or spread out) to acquire new clients, rather than using a highly-focused effort. Current practices to identify and prioritize prospective new clients generally use "black boxes," which do not satisfactorily explain how to identify similarities between existing clients and prospects. As such, a need exits to enable entities to effectively secure (e.g., "win") new clients by knowing which entities (e.g., clients) have a greatest or largest propensity or prospect potential (as compared to other potential clients) to become clients and what goods, services, and/or solutions should be marketed to these high-potential clients.

Accordingly, the present invention provides a solution to cognitively identify white space target entities (e.g., prospective entities/clients having no transactional history with another entity) by a processor. That is, the present invention provides for cognitively identifying similarities between one or more potential target entities and current entities according to structured data and/or unstructured data. A propensity to engage in a transaction agreement for the one or more potential target entities may be determined according to the similarities and historical transaction agreements (e.g., determining high-potential new clients). The propensity to engage in a transaction agreement (e.g., entering into a relationship as a client such as, for example, purchasing goods or services from an entity) includes identifying a substantial likelihood or a highest propensity for obtaining new white space target clients as compared with other potential target clients.

Thus, the preset invention relates to evaluating and analyzing one or more client entities and enterprise entities (e.g., businesses, organizations, or governments) to enable the enterprise entities to identify those potential client entities having a highest potential (e.g., a highest percentage) for selecting one or more transactions for goods or services.

In one aspect, the present invention provides for evaluating and identifying key, target clients having a level of similarity to current clients of an entity above a selected threshold for developing, building, and maintaining a new client relationship. Targeted client entities are also identified as key client entities for increased transactional opportunities based on similarities with existing/current clients and previous transactional or business type transactions of the existing/current clients.

Data may be collected from a knowledge domain relating to a plurality of entities and text data extracted from one or more data sources. In one aspect, data from one or more online data sources may be identified and/or processed using natural language processing (NLP) operations. A graphical user interface (GUI) (e.g., an interactive GUI) of a computing device may be used to display the cognitive recommendations, suggestions, or predictions for an identified target entity as a valid candidate for establishing a potential relationship according to a similarity score and/or event trigger model.

In one aspect, white space or "whitespace" is any identified business opportunity (e.g., a "transactional operation" such as a sales opportunity or vendor-client relationship). A whitespace may also be where unmet and unarticulated needs are uncovered to create innovation opportunities. Whitespace may also include new or upgraded products and services that may be sold or products or services that do not exist. Whitespace may be opportunities identified for one or more entities of existing businesses, entities searching for increased growth opportunities, or companies wanting to explore strategic diversification. Thus, a white space client or "whitespace target entity" may be an identified client or entity with whom a business opportunity may be available and any new openings or opportunities untouched by competitors, or it can be considered part of a remote and/or different industry or outside the boundaries of the firm. White space may also include outcome(s) of customer-entity inquiries and a discovery process, that leads to new profit growth opportunities by defining potential gaps in existing markets. The whitespace target entity identification process can be used to identify entirely new markets, or it can be used to map incremental innovation in products or services. A whitespace target entity can also be a new source of customer value that can be translated to economic value.

It should be noted as described herein, the term "cognitive" (or "cognition") may be relating to, being, or involving conscious intellectual activity such as, for example, thinking, reasoning, or remembering, that may be performed using machine learning. In an additional aspect, cognitive or "cognition" may be the mental process of knowing, including aspects such as awareness, perception, reasoning and judgment. A machine learning system may use artificial reasoning to interpret data from one or more data sources (e.g., sensor based devices or other computing systems) and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor based devices or other computing systems that include audio or video devices). Cognitive may also refer to identifying patterns of behavior, leading to a "learning" of one or more events, operations, or processes. Thus, a cognitive model may, over time, develop semantic labels to apply to observed behavior and use a knowledge domain or ontology to store the learned observed behavior. In one embodiment, the system provides for progressive levels of complexity in what may be learned from the one or more events, operations, or processes.

In an additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with a high degree of accuracy (e.g., within a defined percentage range or above an accuracy threshold), speed and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) retain and recall relevant data points (images, text, voice) (e.g., a high degree of relevant recollection from data points (images, text, voice) (memorization and recall)); and/or 13) Predict and sense with situational awareness operations that mimic human cognition based on experiences.

Thus, the present invention may provide cognitive recommendations, according to user data analysis problems, that may retrieve and mine data sources (e.g., documents, web pages, websites, online journals, conference materials, scientific papers, etc.). One or more relevant methods and features associated with the methodology may be extracted from the mined data sources. In short, the system 1) retrieves one or more articles, 2) extracts one or more methods, and/or extracts one or more features associated with the extracted methods, and/or 3) collects various types of user feedback.

Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer may be able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
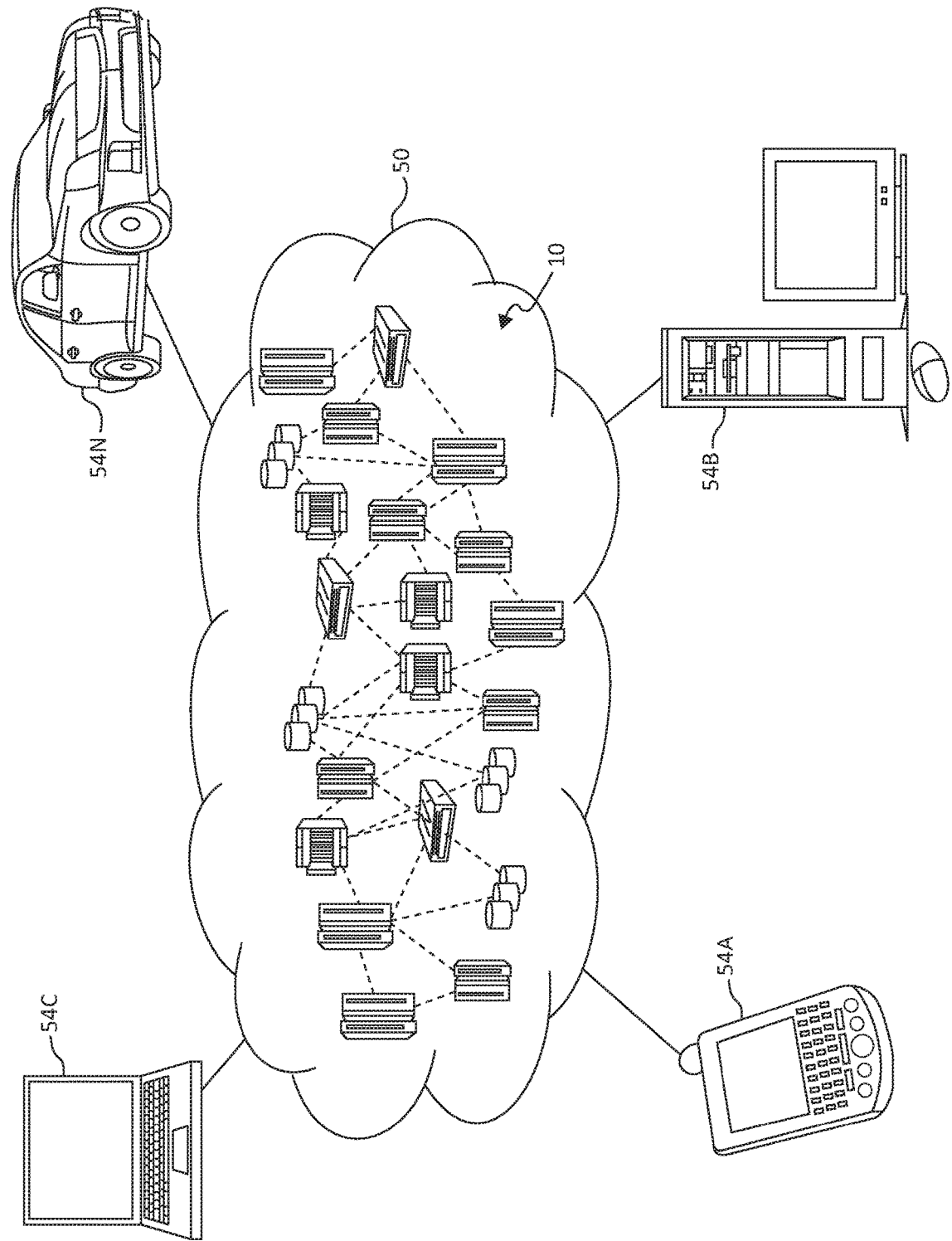
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
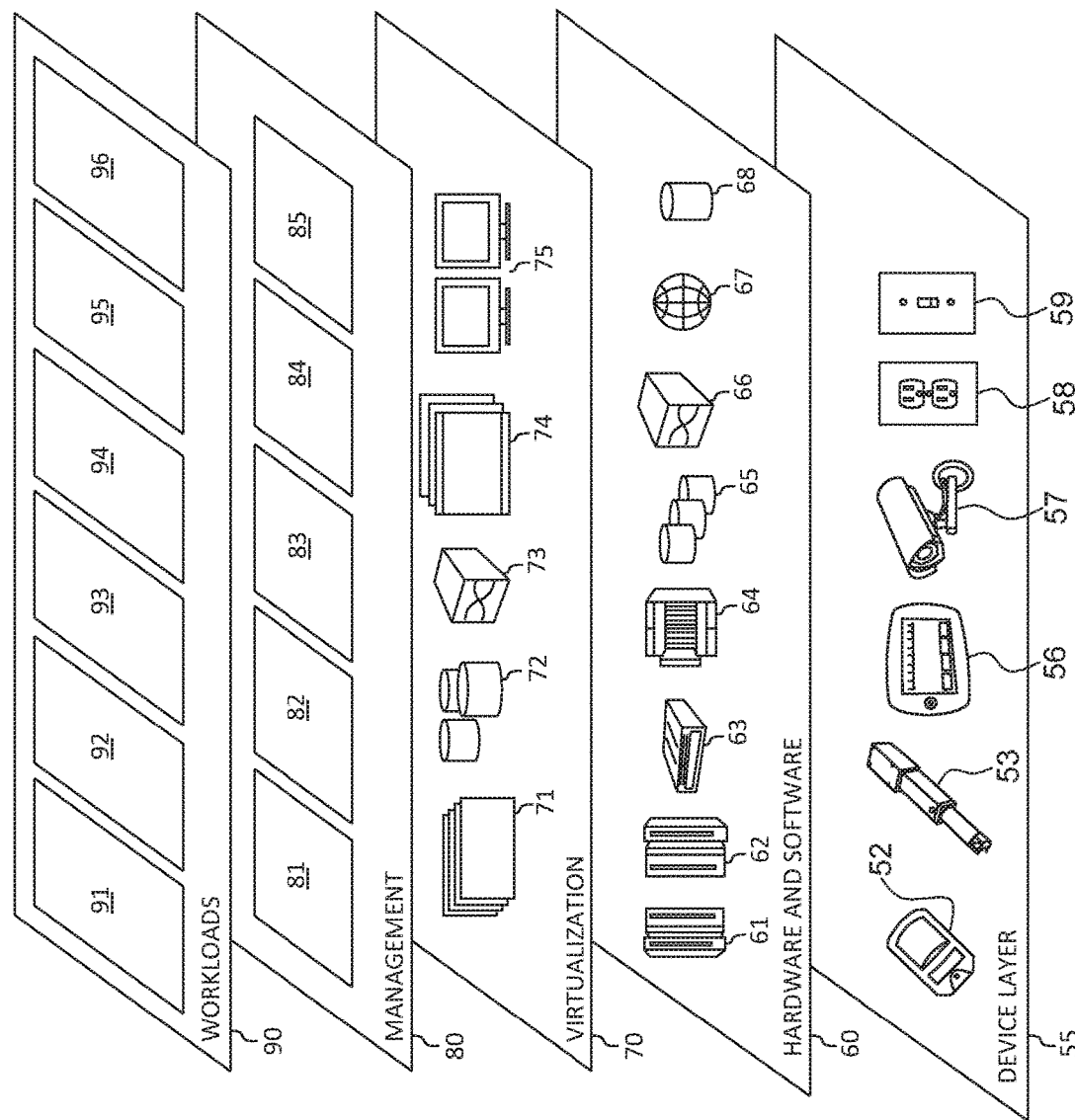
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities (including sensors and actuators) collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, process controller systems and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for cognitively identifying a propensity for obtaining white space target entities. In addition, workloads and functions 96 for cognitively identifying a propensity for obtaining white space target entities may include such operations as data analysis (including data collection and processing from various environmental sensors), and predictive data analytics functions. One of ordinary skill in the art will appreciate that the workloads and functions 96 for cognitively identifying a propensity for obtaining white space target entities may also work in conjunction with other portions of the various abstraction layers, such as those in hardware and software 60, virtualization 70, management 80, and other workloads 90 (such as data analytics processing 94, for example) to accomplish the various purposes of the illustrated embodiments of the present invention.

As described herein, the present invention provides a solution for cognitively identifying a substantial likelihood/propensity for identifying and obtaining new white space target clients. Using an input interface, one or more users may enter firmographic information about a specific client, including revenue, employee count, industry, competitive install, maturity and other firmographic details. The present invention may parse one or more internal data sources such as from a corporate intranet, and also access and parse online data sources (e.g., web pages/web sites), access and download company data from online data sources such as, for example, the "about page" on an entities webpages, Wikipedia, and/or other web resources to extract client descriptions and profiles for each potential client. Using an NLP operation (e.g., semantic similarity), the present invention locates and identifies similarities between a given prospect client entity and a set of existing client entities. In one aspect, the cognitive operations used may include Term-frequency-inverse document frequency (e.g., "Tf-idf") vectors. A Tf-idf is an operation that measures an importance of words in a collection of documents. Said differently, the Tf-idf is a numerical statistic that is intended to reflect how important a word is to a document in a collection or corpus. The Tf-idf operation may provide Tf-idf vector representations of entity descriptions and the vectors may be compared to identify similarities between the documents, which are then used to establish/determine similarities between existing client entities and a given prospect client entity.

The present invention may incorporate quantitative structured entity/client data from one or more available sources. The present invention may then use a machine learning operation (e.g., collaborative filtering) to identify similarities between the prospective target client and one or more existing clients. The collaborative filtering is a classification-based recommendation model and may be used to identify one or more similarities between one or more potential target entities and current entities according to structured data (e.g., firmographic information). The present invention may then use a weighted average of both a similarity score matrix and a purchase history matrix to calculate the "propensity-to-transact" (e.g., propensity-to-buy) for each of the prospective target clients. The present invention may also parse various online data sources (e.g., the Internet or an intranet) to find product-related events and discover whether those product-related events are related to the prospective target clients. The combination of a propensity or similarity score and event trigger model may be displayed in a user interface ("UI") such as, for example, an estimate of the likelihood that the targeted prospect will buy a specific product displayed in the UI.

Figure 4:
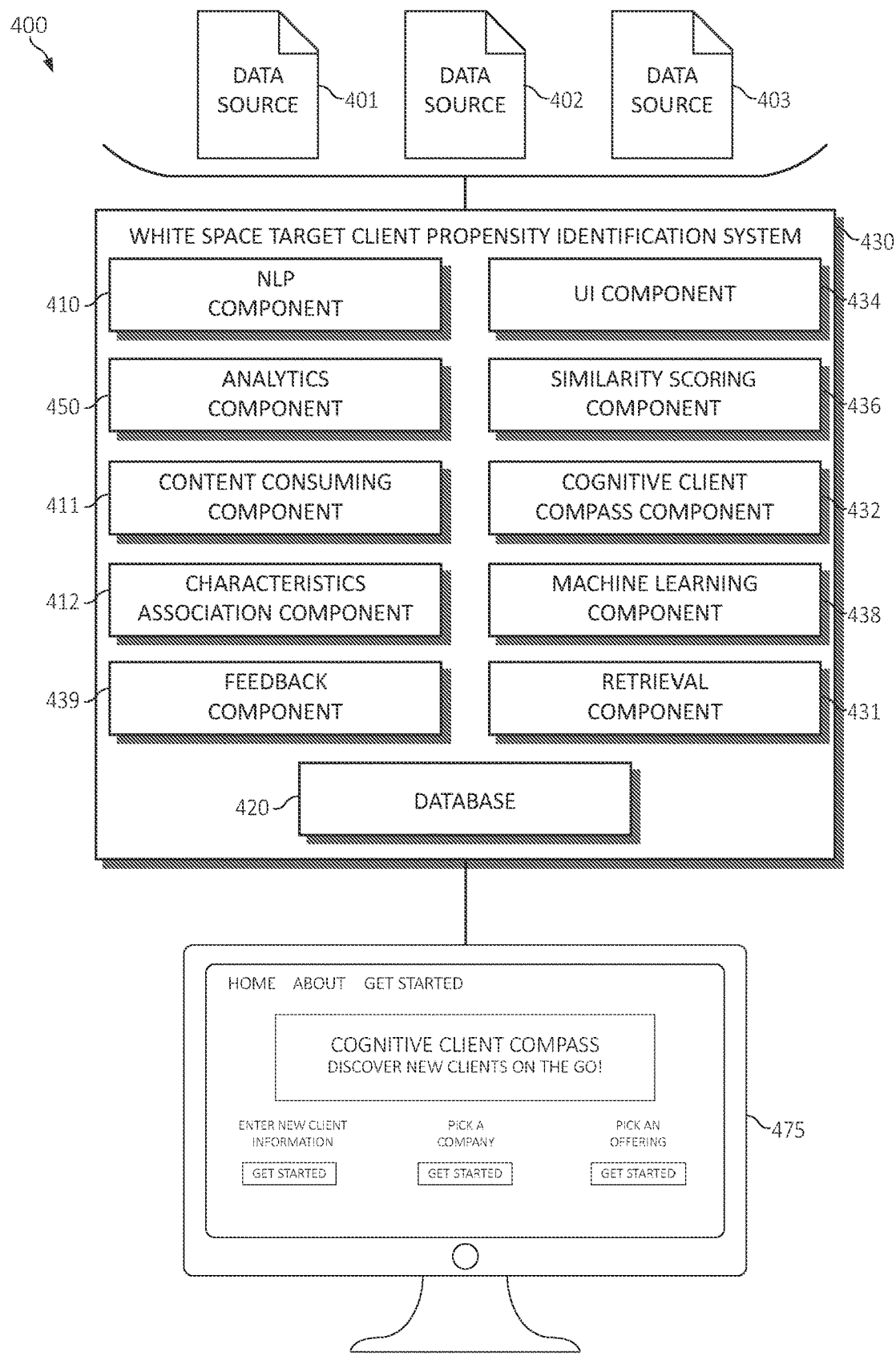
FIG. 4 is a diagram depicting various user hardware and computing components functioning in accordance with aspects of the present invention.

Turning now to FIG. 4, a block diagram of exemplary functionality 400 relating to white space target entity identification, evaluation, and recommendation is depicted. As shown, the various blocks of functionality are depicted with arrows designating the blocks' 400 relationships with each other and to show process flow. Additionally, descriptive information is also seen relating each of the functional blocks 400. As will be seen, many of the functional blocks may also be considered "modules" of functionality, in the same descriptive sense as has been previously described in FIGS. 1-3. With the foregoing in mind, the module blocks 400 may also be incorporated into various hardware and software components of a system for recommending predictive modeling methods and features in accordance with the present invention, such as those described in FIGS. 1-3. Many of the functional blocks 400 may execute as background processes on various components, either in distributed computing components, or on the user device, or elsewhere.

Multiple data sources 401-403 may be provided as a corpus or group of data sources defined and/or requested by a user. The data sources 401-403 may include, but are not limited to, data sources relating to one or more documents, materials related to biographies, books, scientific papers, online journals, blogs, journals, articles, newspapers, and/or other various documents or data sources capable of being published or displayed. The data sources 401-403 may be all of the same type, for example, pages or articles in a wiki or pages of a blog. Alternatively, the data sources 401-403 may be of different types, such as word documents, wikis, web pages, power points, printable document format, or any document capable of being analyzed by a natural language processing system.

In addition to text-based documents, other data sources such as audio, video or image sources may also be used wherein the documents may be pre-analyzed to extract their content for natural language processing, such as converting from audio to text and/or image analysis. The group of data sources 401-403 may be consumed for a target entity evaluation, identification, and recommendation system such as, for example, a white space target client propensity identification system 430 (e.g., high-propensity white space client evaluation, identification, and recommendation system) using natural language processing (NLP) and artificial intelligence (AI) to provide processed content.

The white space target client propensity identification system 430 may include the NLP component 410, a content consuming component 411, a characteristics association component 412, and an analytics component 450.

The data sources 401-403 may be analyzed by the NLP component 410 to data mine the relevant information (e.g., events, products, target client profiles, etc.) from the content of the data sources 401-403 (e.g., methods and features extracted from mined internet web pages, scientific papers, or documents) to display the information in a more usable manner and/or provide the information in a more searchable manner. The NLP component 410 may be an instance of an NLP and AI tool such as, for example, IBM® Watson®, which may be provided as a cloud service or as a local service (IBM® and Watson® are trademarks of International Business Machines Corporation). The instance of Watson® in the NLP component 410, for example, is provided and pointed at the group of data sources.

The NLP component 410 may be associated with the content consuming component 411. The content consuming component 411 may be used for inputting the data sources 401-404 and running NLP and AI tools against them, learning the content, such as by using the machine learning component 438. It should be noted that other components of FIG. 4 may also employ one or more NLP systems and the NLP component 410 is merely illustrated, by way of example only, to demonstrate use of an NLP system. As the NLP component 410 (including the machine learning component 438) learns different sets of data (e.g., target client entities, current client entities, similarities, events, goods/services related to the target client entities and/or current client entities, etc.), the characteristics association component 412 (or "cognitive characteristics association component") may make use of an NLP and AI operation system to make cognitive associations or links between data sources 401-404 by determining concepts, methods, features, similar characteristics, underlying common topics, event, and/or goods and services.

Cognition is the mental process of knowing, including aspects such as awareness, perception, reasoning and judgment. An AI system uses artificial reasoning to interpret the data sources 401-403 and extract their topics, ideas, or concepts. The learned topics and concepts such as, for example, affiliations between people or business, historical transaction data (e.g., a sales operation or sales contract), a monetary value of the transaction operation (e.g., value of the sales contract), a type of transaction, or white space target entity identification and recommendation of a domain of interest, may not be specifically named or mentioned in the data sources 401-403 and are derived by the AI interpretation.

The learned content of the data sources 401-403 consumed by the NLP component 410 may be merged into a database 420 (e.g., a structured database of processed and extracted white space target entity, events, good/services identification and recommendation data) or other data storage having consumed content with learned concepts, methods, and/or features of data sources providing association between the content referenced to the original data sources 401-403. For example, the database 420 may include members of a business or sales organization, names of clients of selected businesses, a client identifier/identification ("ID"), a client business unit, location data of a client, client business domains, opportunity business domains, products of interest to a particular entity/client, identified transaction operation opportunities (e.g., sales opportunities), outcome (s) of transaction operation opportunities including dollar value and a status of the opportunity such as, for example, success, failure, or open/available status.

In one aspect, the database 420 may be a knowledge domain. A knowledge domain of the database 420 may maintain, update, and provide data relating to the knowledge domain. In one aspect, the knowledge domain for the white space target client propensity identification system 430 may be an ontology of concepts representing a domain of knowledge. A thesaurus or ontology may be used as the domain knowledge and may also be used to identify semantic relationships between observed and/or unobserved variables. In one aspect, the term "domain" is a term intended to have its ordinary meaning. In addition, the term "domain" may include an area of expertise for a system or a collection of material, information, content and/or other resources related to a particular subject or subjects. For example, a domain can refer to organizational data (e.g., information relating to a business, organization, or governmental entity), transactional operation data, physical phenomena, environmental, scientific, industrial, educational, statistical data, and/or market data (e.g., public information such as contract prices, stock prices, salary, or product values) information. A domain can refer to information related to any particular subject matter or a combination of selected subjects.

The term ontology is also a term intended to have its ordinary meaning. In one aspect, the term ontology in its broadest sense may include anything that can be modeled as ontology, including but not limited to, taxonomies, thesauri, vocabularies, and the like. For example, an ontology may include information or content relevant to a domain of interest or content of a particular class or concept. The ontology can be continuously updated with the information synchronized with its sources, adding information from the sources to the ontology as models, attributes of models, or associations between models within the ontology.

The content of the original data sources 401-403 remains in the original data sources such as the wiki, web pages, etc., but the database 420 will have a logical understanding of how the original data sources 401-403 fit together using the power of the AI allowing for the concepts and therefore the associations or mappings between the data sources.

The merging of the data into one database 420 allows the white space target client propensity identification system 430 to act like a search engine, but instead of keyword searches, it will use an AI method of making cognitive associations between the data sources using the deduced concepts.

The white space target client propensity identification system 430 may include a UI component 434 (e.g., an interactive graphical user interface "GUI") providing user interaction with the indexed content for mining and navigation and/or receiving one or more inputs/queries from a user's equipment or (or "user equipment" or "UE") 475 (e.g., a computer, laptop, tablet, smart phone, smart watch, and/or other internet of things ("IoT") device) or a "wireless communication device." More, specifically, the UI component 434 may be in communication with the UE 475 (e.g., cellular telephone 54A, desktop computer 54B, laptop computer 54C, and/or automobile computer system 54N of FIG. 2) for also providing user interaction with the indexed content relating to high-propensity white space target client entity identification, evaluation, and recommendation, which may be displayed in the UI component 434.

The UE 475 (e.g., a wireless communication device) may also include a GUI for providing domain-oriented query functionality such as, for example, interactive GUI functionality for interacting with a cognitive client compass application provided by the cognitive client compass component 432 (e.g., the client compass application may be installed locally to the or the UE 475 and/or may be external to the UE 475). For example, the UE 475 may display a cognitive client compass application feature one or more selection tools such as, for example, "enter new client information," "pick a company," and/or "pick an offering" selection tools so as to "get started."

The white space target client propensity identification system 430 may include a retrieval component 431 that may retrieve the one or more data sources (and indexing) and the content and characteristics of the content of the data sources (e.g., retrieving one or more events, goods/services, products, and/or target client entity profiles) that may include one or more event-triggering modeling methods and features. In one aspect, the retrieval component 431 may retrieve data from the structured database 420 (e.g., an offline search) and retrieve and extract additional data from the data sources (e.g., an online search) such as, for example, retrieving from an internet search engine such as, for example, biographies, news articles, or target client entity/organizational data for a business.

The retrieval component 431 may provide a map index of topics or concepts (e.g., methods and/or features of one or more domains of interest) of the consumed data sources 401-403 as consumed by the NLP component 410 mapping to the data sources 401-403. The map index may list sub-topics and hierarchies for navigation and include links or references to the original data sources 401-403.

The white space target client propensity identification system 430 may also include a cognitive client compass component 432, a similarity scoring component 436, and the machine learning component 438.

The cognitive client compass component 432 may monitor, track, and/or identify similarities, connections, or relationships between a target client entity and the current client/entities from the text data or the knowledge domain. The cognitive client compass component 432 may identify an individual entity of the one or more potential target client/entities for establishing a potential transactional operation relationship. The individual entity may be identified as having one or more similarities, connections, or relationships between the one or more potential target entities and current entities according to structured data and unstructured data (which may be accessed from the database 420 and processed by from the data sources 401-403).

In short, the cognitive client compass component 432 may use one or more cognitive operations to discover high-potential and new client entities. The cognitive client compass component 432 may quantify similarities between an enterprise entities (e.g., businesses, organizations, or governments) existing client base and potential target client entities to locate, determine, and/or identify those potential target client entities having a most optimal or greatest potential to become a new client entity (e.g., identify those having the highest potential to purchase the entities goods and/or services). The cognitive client compass component 432 may synthesize quantitative and qualitative data to compute similarities between an entities existing client entities base and prospects. The cognitive client compass component 432 may then use the existing client base transaction history (e.g., purchase history) to recommend products, goods, services, and/or solutions to offer and/or promote to high-potential prospects.

The similarity scoring component 436 may determine a similarity score between the one or more potential target entities and the current entities according to the structured data (e.g., firmographic data such as revenue, industry, size, etc.) and/or the unstructured data (e.g., company descriptions, social media pages, about pages). The similarity scoring component 436 may also determine a weighted average between a similarity score between the one or more potential target entities and the current entities and historical transactions of current and/or previous client entities.

The similarity score may also be based upon a number of similarities between the one or more potential target entities and the current entities according to structured data and unstructured data such as, for example, similar characteristics, similar transactional operations, a similar number of transactional operation opportunities won by an entity, a similar number of transactional operation opportunities lost by an entity, a monetary value of a transaction operation, a similar number and type of products provided, offered, or requested by an entity, similar products of an identified competitor-entity, a similar number of individual entities connected to one or more current client/entities, a connection sentiment, or a combination thereof. Thus, the similarity score may be assigned to each target client with a connection strength between the one or more potential target entities and one or more current entities. The UE 475 may also display the propensity score and event trigger model results with an estimate of the likelihood (e.g., a percentage, the propensity score, and/or the propensity score above or below a threshold) that the targeted prospect will enter a transaction agreement for specific products, goods, services, and/or solutions.

Thus, the cognitive client compass component 432 may use the similarity scores for determining the propensity to engage in a transaction agreement for the one or more potential target entities according to the similarities and historical transaction agreements. The cognitive client compass component 432 may the use the weighted average between a similarity score between the one or more potential target entities and the current entities and the historical transaction agreements for determining the propensity to engage in the transaction agreement.

In an additional aspect, the cognitive client compass component 432 may compare the similarities between potential new clients and existing clients on the basis of the purchase history of existing clients. The cognitive client compass component 432 may predict which potential new target clients are most likely to enter a transaction agreement for a given offering, allowing entities to prioritize prospects. Thus, the cognitive client compass component 432 provides for accurate and reliable likelihood-to-buy scores (e.g., similarity scores such as a percentage, a range of values, or a score above and/or below a threshold, etc.) even with partial data while also enabling users to intuitively understand a justification behind each high-potential target client/entity recommendation.

In one aspect, a similarity scoring component 436 may perform one or more various types of calculations or computations. The calculation or computation operations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

The white space target client propensity identification system 430 may also include a machine learning component 438. The machine learning component 438 may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive Bayes classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, Fisher's linear discriminant, logistic regression, perceptron, support vector machines, quadratic classifiers, k-nearest neighbor, hidden Markov models and boosting. Some non-limiting examples of unsupervised learning which may be used with present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5:
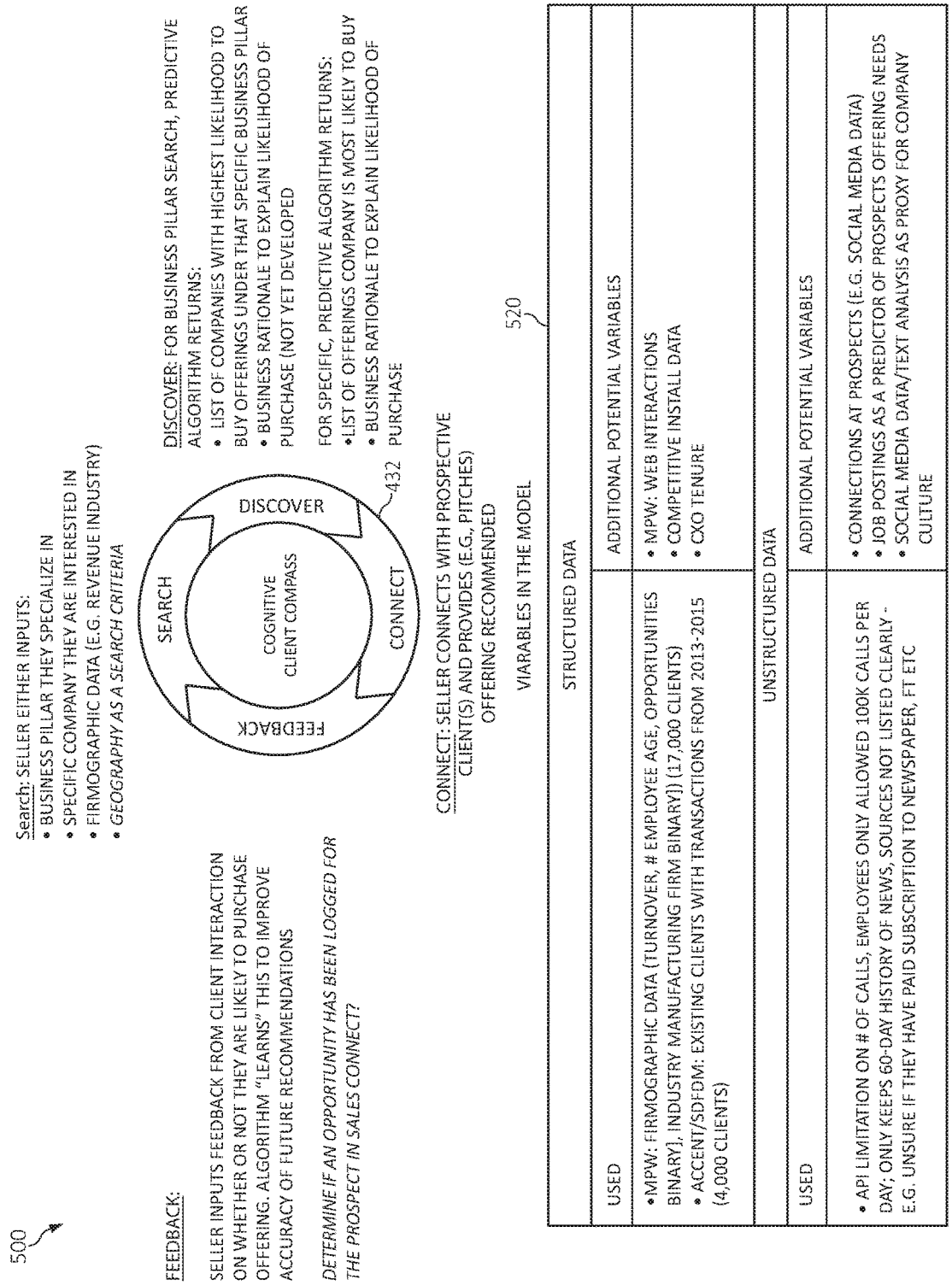
FIG. 5 is a diagram depicting an exemplary use of a cognitive client compass for cognitively identifying a propensity for obtaining white space target entities in which aspects of the present invention may be realized.

Consider the following example of the aforementioned functionality of the cognitive client compass component 432 that is further illustrated in FIG. 5. With the foregoing in mind and as a preliminary matter, the systems 500 of FIG. 5 may also be incorporated into various hardware and software components of a system for recommending predictive modeling methods and features in accordance with the present invention, such as those described in FIGS. 1-4. The systems 500 may execute as background processes on various components, either in distributed computing components, or on the user device, or elsewhere.

As shown, cognitive client compass component 432 includes 1) a search feature, 2) a discover feature, 3) a connect feature, and/or 4) a feedback feature. In operation, an entity (e.g., a "seller" or entity having an offering) may either input the following. The seller may input into the search feature: a business pillar specialized in by the seller, a specific company the seller is interested in, firmographic data (e.g., revenue, industry), and/or geographical information as a search criteria.

For a business pillar search, one or more predictive algorithms may be used and return a list of companies with a highest likelihood (e.g., a value greater than a threshold value, a defined percentage, or a value within a define range of values) to purchase offerings under that specific business pillar. Also, the business rational may provide justification and/or evidence (e.g., an explanation) of the likelihood of purchase for products, goods, services, and/or solutions, which may not be completely developed. For a specific target entity search, one or more predictive operations may provide a list of one or more offerings (e.g., goods, services, and/or services) a specific target entity is most likely to acquire, obtain, secure, transact for, and/or purchase. Also, any recent events for a target client entity may be flagged.

The cognitive client compass component 432, using the connection feature, connects an entity (e.g., seller) with one or more prospective client entities (e.g., prospective clients) and provides (e.g., pitches) one or more recommended offerings.

The cognitive client compass component 432, using the feedback feature, enables the entity (e.g., seller) to input feedback from client interactions such as, for example, whether the client is likely (e.g., a percentage) to acquire, obtain, secure, transact for, and/or purchase one or more recommended offerings. A machine learning operation may use the feedback to learn and improve the accuracy of further recommended offerings. In one aspect, the cognitive client compass component 432 may use one or more variables in a recommending predictive model for structured data and unstructured data, as depicted in table 520 of FIG. 5. In one aspect, "MPW, ACCENT/SDFDM, and CXO) are different databases which have different data which served as inputs for an analytical model.

Figure 6:
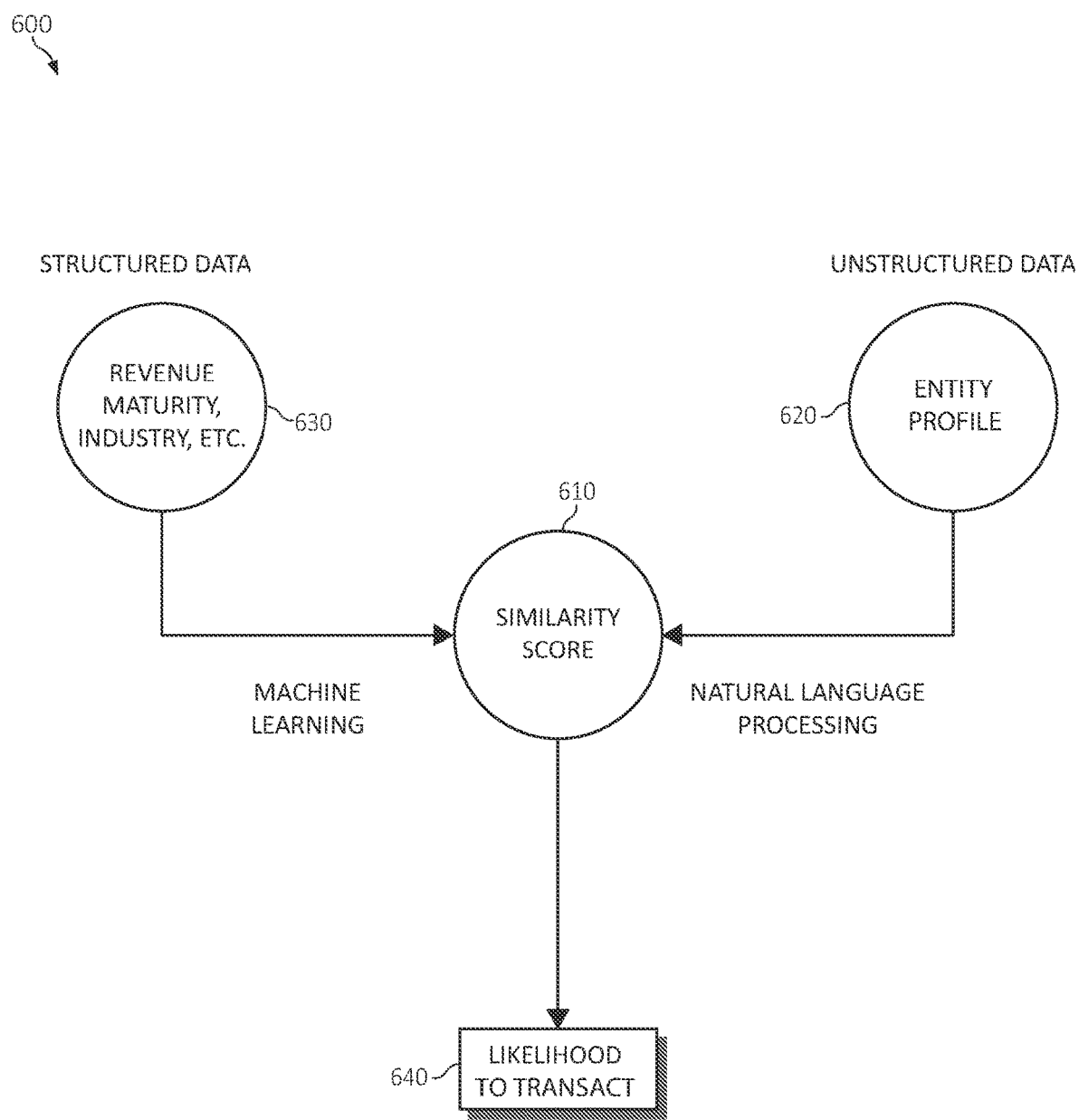
FIG. 6 is an additional block diagram depicting an exemplary functional relationship between various aspects of the present invention.

Turning now to FIG. 6, a block diagram is depicted of exemplary functionality 600 relating to use of a cognitive client compass for enabling new client discovery using structured and unstructured data to provide one or more offering recommendations according to various aspects of the present invention. As shown, the various blocks of functionality are depicted with arrows designating the blocks' 600 relationships with each other and to show process flow. Additionally, descriptive information is also seen relating each of the functional blocks 600. As will be seen, many of the functional blocks may also be considered "modules" of functionality, in the same descriptive sense as has been previously described in FIGS. 1-5. With the foregoing in mind, the module blocks 600 may also be incorporated into various hardware and software components of a system for image enhancement in accordance with the present invention. Many of the functional blocks 600 may execute as background processes on various components, either in distributed computing components, or on the user device, or elsewhere, and generally hidden to the user.

Starting with block 630, structured data (e.g., revenue data, maturity data, industry data, etc.) relating to one or more entities may be processed using a machine learning operation. In block 620, one or more entity profiles (e.g., a company profile) may be processed using an NLP operation. From both blocks 620 and 630, the processed data may be used to determine a similarity score between the one or more potential target entities and the current entities according to the structured data and the unstructured data, as in block 610.

The similarity score may be used to determine a propensity for the one or more potential target entities to engage in a transaction agreement (e.g., a likelihood to transact/buy goods, services, and/or solutions, etc.) according to the similarities and historical transaction agreements, as in block 640. That is, the similarity score may be used to determine a level of potential for engaging in a transaction agreement (e.g., having a similarity score above a threshold, percentage, and/or within a selected range of values).

Figure 7:
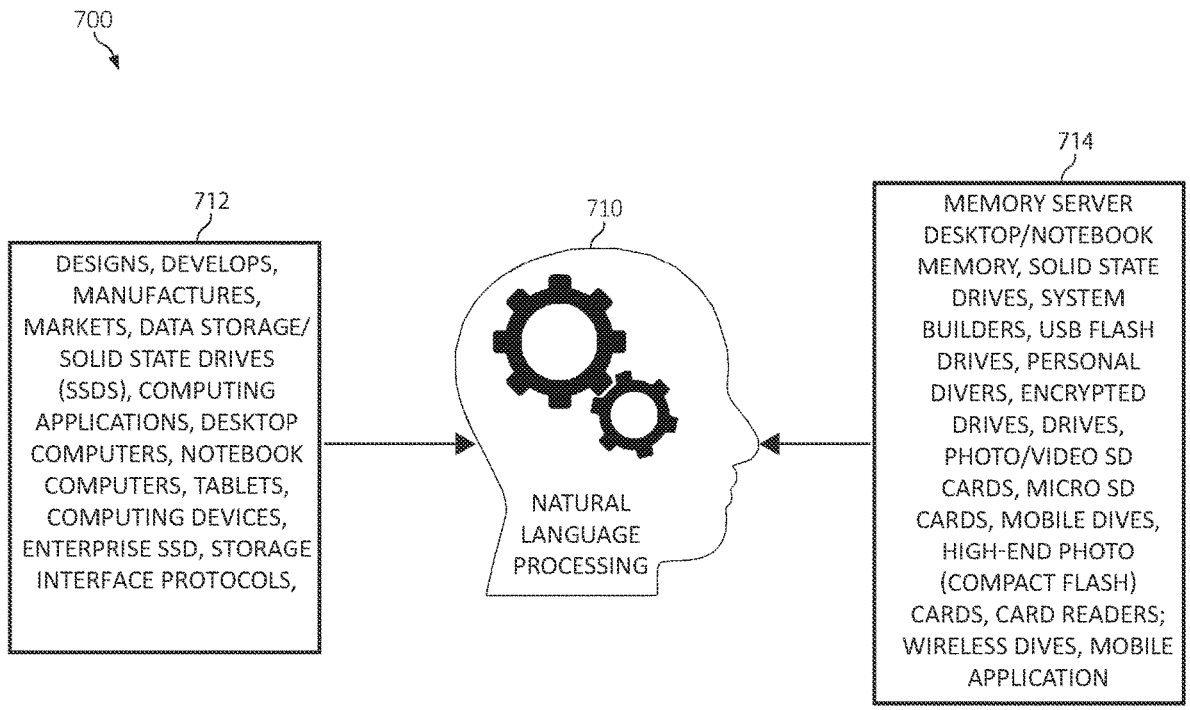
FIG. 7 is an additional block diagram depicting an exemplary functional relationship using of a semantic similarity model for cognitively identifying a propensity for obtaining white space target entities in which aspects of the present invention may be realized.
Figure 7:
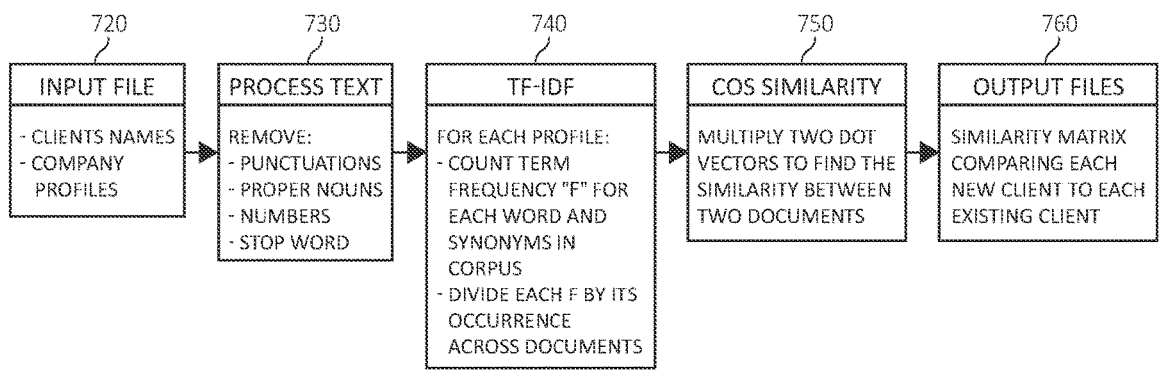

Turning now to FIG. 7, a block diagram is depicted of exemplary functionality 700 relating to use of a semantic similarity model for cognitively identifying a propensity for obtaining white space target entities according to various aspects of the present invention.

As shown, the various blocks of functionality are depicted with arrows designating the blocks' 700 relationships with each other and to show process flow. As shown, the various blocks of functionality are depicted with arrows designating the blocks' 700 relationships with each other and to show process flow. Additionally, descriptive information is also seen relating each of the functional blocks 700. As will be seen, many of the functional blocks may also be considered "modules" of functionality, in the same descriptive sense as has been previously described in FIGS. 1-6. Many of the functional blocks 700 may execute as background processes on various components, either in distributed computing components, or on the user device, or elsewhere, and generally hidden to the user performing generalized tasks.

Starting with block 710, a semantic similarity model may use an NLP operation that may parse online data sources and identify, extract, and/or process data 712, 714 (e.g., extracted topics, keywords, text data, etc.) that may be similar to one or more potential target entities and current entities.

The semantic similarity model may process and/or provide an input file, which may include, for example, a client entity's name and/or one or more entity (e.g., company) profiles, as in block 720. The semantic similarity model may process the text of the input file and remove various parts of the processed data such as, for example, punctuations, proper nouns, numbers, and/or stop words, as in block 730. In block 740, the semantic similarity model may perform a Tf-idf operation. For each entity/company profile, the Tf-idf operation may count a term frequency ("F") for each word and/or synonyms in a corpus of text and divide each term frequency ("F") by a number of occurrence of the term in one or more documents, as in block 740. In block 750, the semantic similarity model may perform a Cos similarity operation (e.g., a formula used to identify how close two vectors are to each other by taking a cosine of the angle of the two) that multiplies two dot vectors to identify a similarity between two documents. In block 760, a similarity matrix may be generated that compares each new potential client entity to each exiting client entity.

Figure 8A:
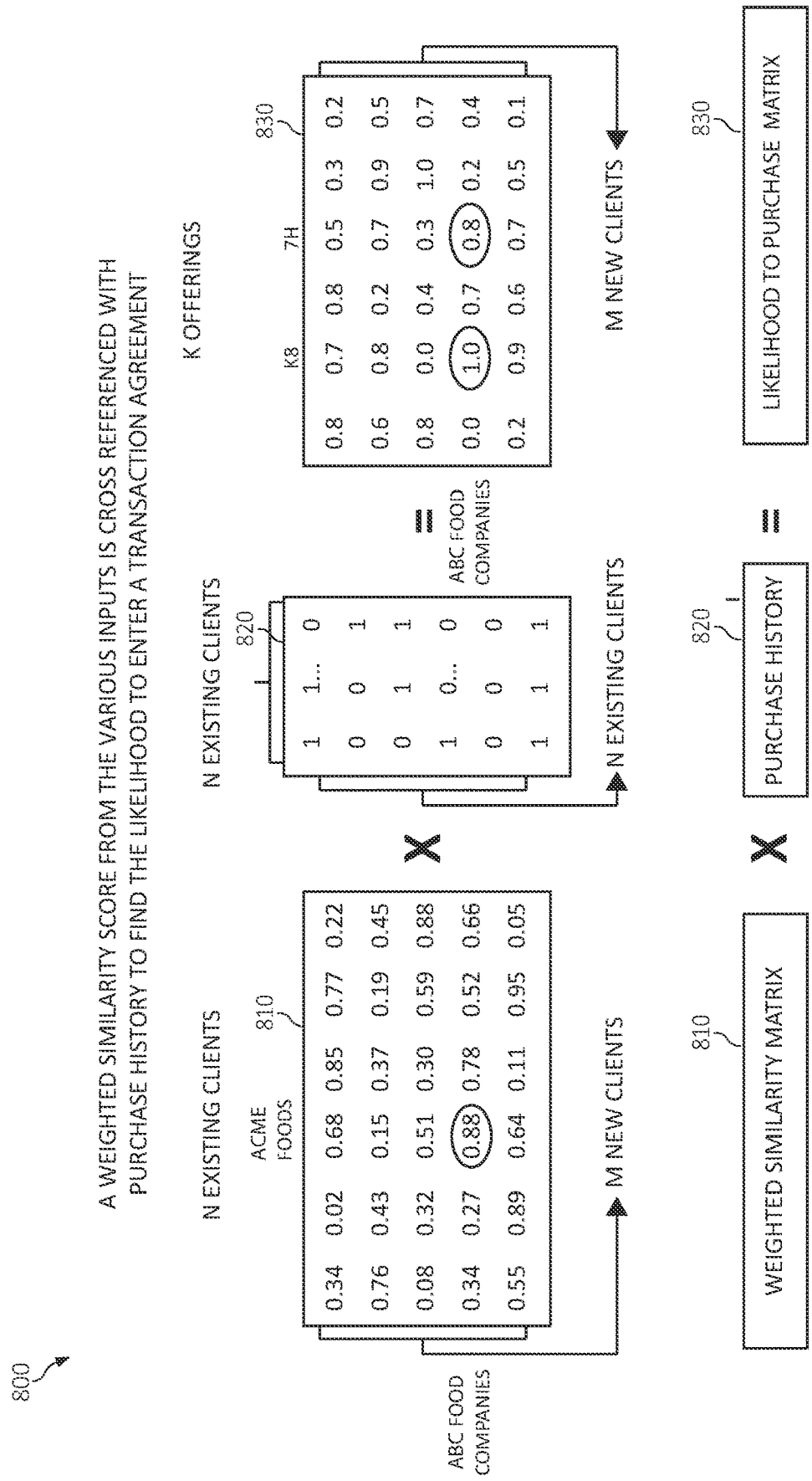
FIG. 8A-8B are additional block diagrams depicting exemplary functional operations of weighted similarity scores and an event trigger model in which aspects of the present invention may be realized.
Figure 8B:
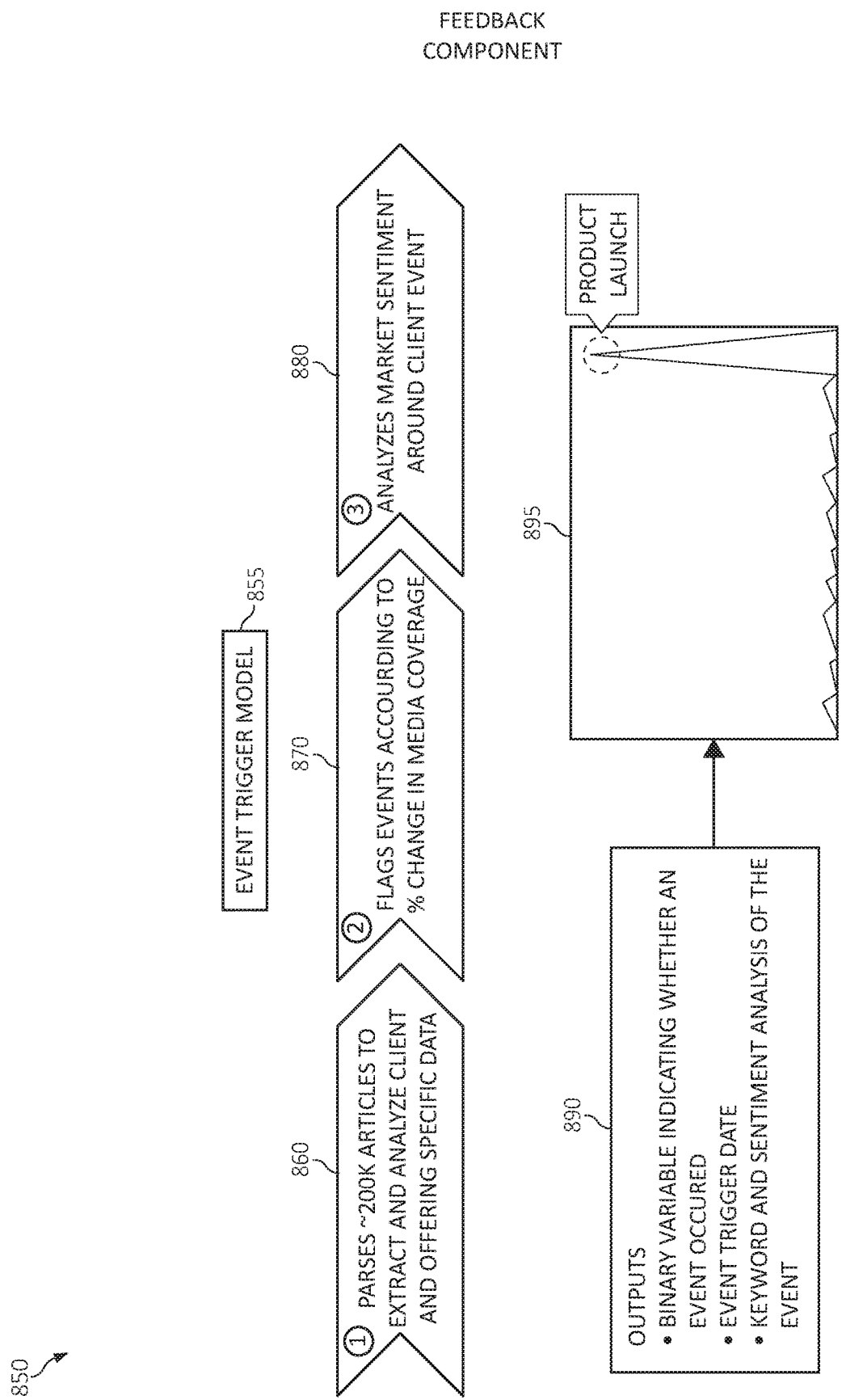

Turning now to FIGS. 8A-8B, a block diagram is depicted of exemplary functionality 800 and 850 relating to use of a weighted similarity scores and an event trigger model according to various aspects of the present invention. As shown, the various blocks of functionality are depicted with arrows designating the blocks' 800 and 850 relationships with each other and to show process flow. Additionally, descriptive information is also seen relating each of the functional blocks 800 and 850. As will be seen, many of the functional blocks may also be considered "modules" of functionality, in the same descriptive sense as has been previously described in FIG. 1-7. Many of the functional blocks 800 and 850 may execute as background processes on various components, either in distributed computing components, or on the user device, or elsewhere, and generally hidden to the user performing generalized tasks.

In FIG. 8A, a weighted similarity score matrix 810 for an "m" number of one or more potential target entities (e.g., new clients of "ABC food companies" for example) and "n" number of current entities may be multiplied with a matrix of historical purchases 820 (e.g., a purchase history matrix) of the n number of current entities (e.g., "Acme foods"). A "likelihood to purchase" matrix is generated to identify a propensity to engage in a transaction agreement for the one or more potential target entities according to weighted similarity score matrix 810 multiplied by the purchase history matrix 820.

In FIG. 8B, an event trigger model 855 may be used to parse one or more online data sources and/or documents (e.g., above 200,000 articles) to extract and analyze client data and offering specific data, as in block 860. Offering specific data is data that pertains to the offering such as, for example, a description of what the offering is and does, the target of offering, and in what scenarios would the offering be the right choice to solve a particular problem. In block 870, one or more events may be flagged according to a change (e.g., a percentage change) in media coverage. In block 880, the event trigger model 855 may analyze market sentiment associated with a client event. The event trigger model 855 may output 1) one or more binary variables indicating whether or not an event has occurred, 2) event trigger data, and/or 3) keyword and sentiment analysis of the event, as in block 890. In block 895, an event trigger model graph may be provided and/or displayed on an interactive GUI on a computing device reflective of the output data from block 890 (which may indicate a particular or defined time to provide an offering such as, for example, a time for when to launch a selected good, service, and/or solution).

Figure 9:
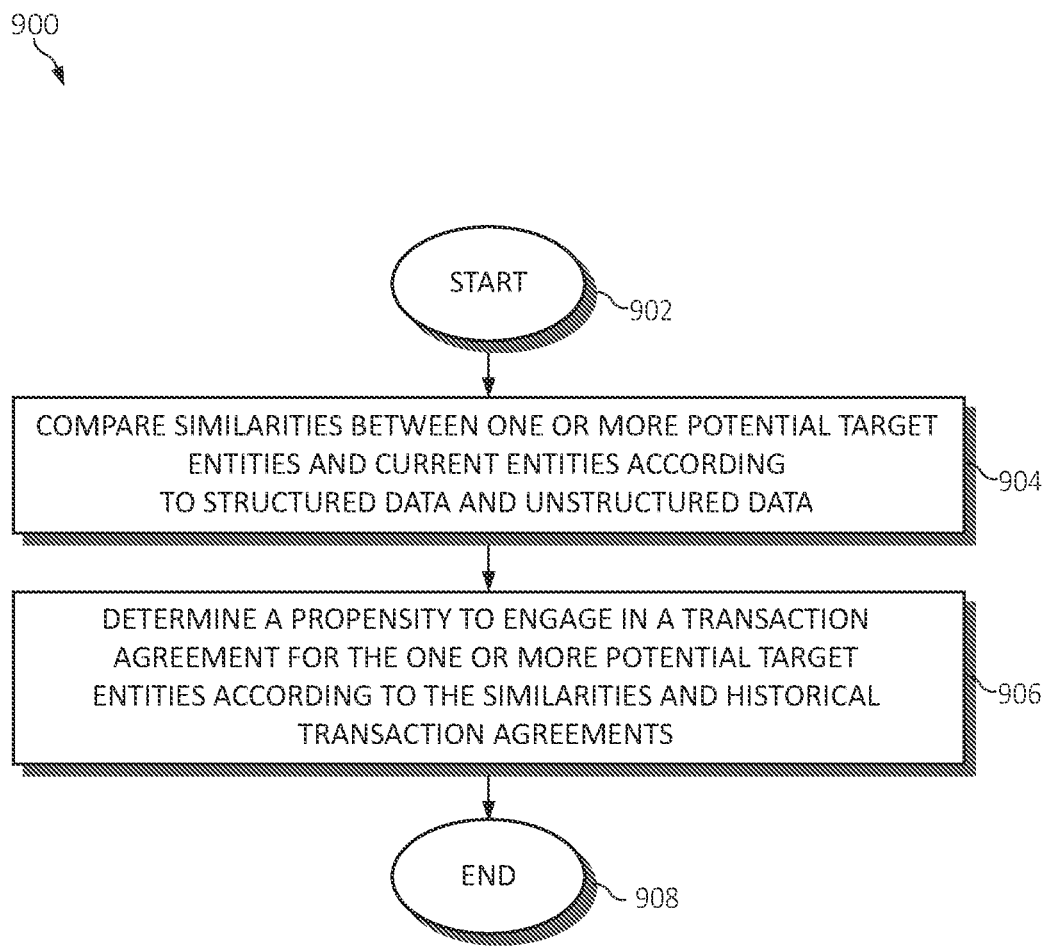
FIG. 9 is a flowchart diagram of an exemplary method cognitively identifying a propensity for obtaining white space target entities by a processor, in which various aspects of the illustrated embodiments may be implemented.

FIG. 9 is a flowchart diagram of an exemplary method for identifying and evaluating white space target entities for transaction operations by a processor, in which various aspects of the illustrated embodiments may be implemented. The functionality 900 may be implemented as a method executed as instructions on a machine, where the instructions are included on at least one computer readable storage medium or one non-transitory machine-readable storage medium.

The functionality 900 may start in block 902. Similarities between one or more potential target entities and current entities may be compared according to structured data and unstructured data, as in block 904. A propensity to engage in a transaction agreement may be determined for one or more potential target entities according to the similarities and historical transaction agreements, as in block 906. The functionality 900 may end in block 908.

In one aspect, in conjunction with and/or as part of at least one block of FIG. 9, the operations of method 900 may include each of the following. The operations of method 900 may include determining a similarity score between the one or more potential target entities and the current entities according to the structured data and the unstructured data, and using a weighted average between a similarity score between the one or more potential target entities and the current entities and the historical transaction agreements for determining the propensity to engage in the transaction agreement.

The operations of method 900 may include identifying the similarities between the one or more potential target entities and the current entities from one or more online data sources using a lexical analysis, parsing, extraction of concepts, semantic analysis, or a combination thereof, and using an NLP operation to determine the similarities between the one or more potential target entities and the current entities. A machine learning operation may be initialized to learn and identify the similarities between the one or more potential target entities and the current entities.

The operations of method 900 may include identifying one or more events, products, or combination thereof from one or more online data sources using a lexical analysis, parsing, extraction of concepts, semantic analysis, or a combination thereof, and also determining the one or more events, products, or combination thereof that are associated with the one or more potential target entities.

The similarity score between the one or more potential target entities and the current entities, an event trigger model, and the propensity to engage in the transaction agreement, or a combination thereof may be displayed in an interactive graphical user interface (GUI).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for cognitively identifying white space target entities by a processor, comprising:
   receiving, by the processor through a user interface (UI), input of firmographic information associated with products supplied by one or more current entities comprising current business clients of an organization;
   receiving, by the processor, structured data and unstructured data relating to one or more potential target entities comprising target business clients of the organization;
   training, by a machine learning operation executed by the processor, a classifier of a classification-based recommendation model using the structured data and the unstructured data to identify similarities between the one or more current entities and the one or more potential target entities, wherein identifying the similarities further includes performing a semantic analysis of term frequency-inverse document frequency (TF-IDF) vectors within the structured data and the unstructured data to develop a similarity matrix of the one or more potential target entities and the one or more current entities;
   comparing, by the processor, similarities between one or more potential target entities and the current entities according to an analyzation of the similarity matrix output by the classification-based recommendation model;
   parsing, by the processor, those portions of the structured data and the unstructured data received from one or more online data sources to identify event trigger data associated with the products, wherein the event trigger data is indicative of one or more events having an effect on market sentiment in a domain of the one or more current entities notwithstanding whether the one or more events have already occurred, and wherein at least one of the one or more events is a percentage in change of media coverage of the one or more potential target entities as reported in the one or more online data sources;
   determining, by the processor, a propensity to engage in a transaction agreement for the products by the one or more potential target entities according to the similarity matrix, the event trigger data, and historical transaction agreements; and
   outputting, by the processor on the UI via a display, an indication of the determined propensity to engage in the transaction agreement for the products by the one or more potential target entities, wherein the output includes presenting an event trigger model graph, generated from the event trigger data, indicating a particular time when the propensity is predicted to be highest as to when to offer the transaction agreement for the products to the one or more potential target entities.

2. The method of claim 1, further including determining a similarity score between the one or more potential target entities and the current entities according to the structured data and the unstructured data.

3. The method of claim 1, further including using a weighted average between a similarity score between the one or more potential target entities and the current entities and the historical transaction agreements for determining the propensity to engage in the transaction agreement.

4. The method of claim 1, further including:
   identifying the similarities between the one or more potential target entities and the current entities from the one or more online data sources using a lexical analysis, extraction of concepts, or a combination thereof; and using natural language processing (NLP) to determine the similarities between the one or more potential target entities and the current entities.

5. The method of claim 1, further including:

identifying the one or more events, the products, or combination thereof from the one or more online data sources using a lexical analysis, extraction of concepts, or a combination thereof; and determining the one or more events, products, or combination thereof are associated with the one or more potential target entities.

6. The method of claim 1, further including displaying a similarity score between the one or more potential target entities and the current entities as part of the output of the indication of the determined propensity.

7. A system for cognitively identifying white space target entities, comprising:

one or more computers with executable instructions that when executed by a processor cause the system to:

receive, by the processor through a user interface (UI), input of firmographic information associated with products supplied by one or more current entities comprising current business clients of an organization;

receive, by the processor, structured data and unstructured data relating to one or more potential target entities comprising target business clients of the organization;

train, by a machine learning operation executed by the processor, a classifier of a classification-based recommendation model using the structured data and the unstructured data to identify similarities between the one or more current entities and the one or more potential target entities, wherein identifying the similarities further includes performing a semantic analysis of term frequency-inverse document frequency (TF-IDF) vectors within the structured data and the unstructured data to develop a similarity matrix of the one or more potential target entities and the one or more current entities;

compare, by the processor, similarities between one or more potential target entities and the current entities according to an analyzation of the similarity matrix output by the classification-based recommendation model;

parse, by the processor, those portions of the structured data and the unstructured data received from one or more online data sources to identify event trigger data associated with the products, wherein the event trigger data is indicative of one or more events having an effect on market sentiment in a domain of the one or more current entities notwithstanding whether the one or more events have already occurred, and wherein at least one of the one or more events is a percentage in change of media coverage of the one or more potential target entities as reported in the one or more online data sources;

determine, by the processor, a propensity to engage in a transaction agreement for the products by the one or more potential target entities according to the similarity matrix, the event trigger data, and historical transaction agreements; and output, by the processor on the UI via a display, an indication of the determined propensity to engage in the transaction agreement for the products by the one or more potential target entities, wherein the output includes presenting an event trigger model graph, generated from the event trigger data, indicating a particular time when the propensity is predicted to be highest as to when to offer the transaction agreement for the products to the one or more potential target entities.

8. The system of claim 7, wherein the executable instructions further determine a similarity score between the one or more potential target entities and the current entities according to the structured data and the unstructured data.

9. The system of claim 7, wherein the executable instructions further use a weighted average between a similarity score between the one or more potential target entities and the current entities and the historical transaction agreements for determining the propensity to engage in the transaction agreement.

10. The system of claim 7, wherein the executable instructions further:

identify the similarities between the one or more potential target entities and the current entities from the one or more online data sources using a lexical analysis, extraction of concepts, or a combination thereof; and use natural language processing (NLP) to determine the similarities between the one or more potential target entities and the current entities.

11. The system of claim 7, wherein the executable instructions further:

identify the one or more events, the products, or combination thereof from the one or more online data sources using a lexical analysis, extraction of concepts, or a combination thereof; and determine the one or more events, products, or combination thereof are associated with the one or more potential target entities.

12. The system of claim 7, wherein the executable instructions further display a similarity score between the one or more potential target entities and the current entities as part of the output of the indication of the determined propensity.

13. A computer program product for cognitively identifying white space target entities by a processor, the computer program product comprising a non-transitory computer-readable storage medium having computer-readable program code portions stored therein, the computer-readable program code portions comprising:

an executable portion that receives, by the processor through a user interface (UI), input of firmographic information associated with products supplied by one or more current entities comprising current business clients of an organization;

an executable portion that receives, by the processor, structured data and unstructured data relating to one or more potential target entities comprising target business clients of the organization;

an executable portion that trains, by a machine learning operation executed by the processor, a classifier of a classification-based recommendation model using the structured data and the unstructured data to identify similarities between the one or more current entities and the one or more potential target entities, wherein identifying the similarities further includes performing a semantic analysis of term frequency-inverse document frequency (TF-IDF) vectors within the structured data and the unstructured data to develop a similarity matrix of the one or more potential target entities and the one or more current entities;

an executable portion that compares, by the processor, similarities between one or more potential target entities and the current entities according to an analyzation of the similarity matrix output by the classification-based recommendation model;

an executable portion that parses, by the processor, those portions of the structured data and the unstructured data received from one or more online data sources to identify event trigger data associated with the products, wherein the event trigger data is indicative of one or more events having an effect on market sentiment in a domain of the one or more current entities notwithstanding whether the one or more events have already occurred, and wherein at least one of the one or more events is a percentage in change of media coverage of the one or more potential target entities as reported in the one or more online data sources;

an executable portion that determines, by the processor, a propensity to engage in a transaction agreement for the products by the one or more potential target entities according to the similarity matrix, the event trigger data, and historical transaction agreements; and an executable portion that outputs, by the processor on the UI via a display, an indication of the determined propensity to engage in the transaction agreement for the products by the one or more potential target entities, wherein the output includes presenting an event trigger model graph, generated from the event trigger data, indicating a particular time when the propensity is predicted to be highest as to when to offer the transaction agreement for the products to the one or more potential target entities.

14. The computer program product of claim 13, further including an executable portion that:

determine a similarity score between the one or more potential target entities and the current entities according to the structured data and the unstructured data; and use a weighted average between the similarity score between the one or more potential target entities and the current entities and the historical transaction agreements for determining the propensity to engage in the transaction agreement.

15. The computer program product of claim 13, further including an executable portion that:

identifies the similarities between the one or more potential target entities and the current entities from the one or more online data sources using a lexical analysis, extraction of concepts, or a combination thereof; and use natural language processing (NLP) to determine the similarities between the one or more potential target entities and the current entities.

16. The computer program product of claim 13, further including an executable portion that:

identifies the one or more events, the products, or combination thereof from the one or more online data sources using a lexical analysis, extraction of concepts, or a combination thereof; and determines the one or more events, products, or combination thereof are associated with the one or more potential target entities.

17. The computer program product of claim 13, further including an executable portion that displays a similarity score between the one or more potential target entities and the current entities as part of the output of the indication of the determined propensity.

* * * * *